Oct. 31, 1961 L. M. SMITH 3,007,058

TRANSISTOR PULSE GENERATOR

Filed Dec. 31, 1957

INVENTOR
L. M. SMITH
BY
Walter M. Hill
ATTORNEY 3,007,058
Patented Oct. 31, 1961

3,007,058

TRANSISTOR PULSE GENERATOR

Larrabee M. Smith, Morris Plains, N.J., assignor to Bell Telephone Laboratories, Incorporated, New York, N.Y., a corporation of New York Filed Dec. 31, 1957, Ser. No. 706,504
13 Claims. (Cl. 307—88.5)

This invention pertains to pulse generation, and particularly to means for stabilizing the duration of pulses produced by a transistor pulse generator.

Pulse generators for producing pulses of predetermined duration in response to initiating trigger pulses are widely used in digital counting and computing systems and in radar equipment. From the standpoint of simplicity of construction and economy of operation, a particularly advantageous circuit for this purpose comprises a single transistor of the type having a current gain exceeding unity. With appropriate associated circuitry, such a transistor can be caused to exhibit a negative resistance characteristic at its terminals. A trigger pulse applied to one terminal will then initiate regenerative switching of the transistor from a quiescent operating state to a temporarily stable operating state. After a time dependent on the associated circuitry and on its internal characteristics, the transistor will regeneratively revert to its quiescent state. Since the voltage at the output terminal of the transistor differs in the two operating states, an output pulse is produced having a duration determined by the time for reversion to the quiescent state to occur. A complete description of the three basic types of such monostable transistor pulse generators, corresponding to triggering at the base, the emitter or the collector, is given in the article "Transistors in Switching Circuits" by A. E. Anderson, appearing on pages 1541–1562 of the Transistor Issue of the Proceedings of the I.R.E. for November, 1952.

The transistor characteristics which determine the time for it to revert to the quiescent state from the temporarily stable state are its dynamic current gain and its saturation current. The former quantity ($\alpha$) is the ratio of the change in collector current produced by a change in emitter current, and varies considerably with different transistors even though they may be constructed as nearly alike as possible. The saturation current ($I_{co}$) is the collector current which exists when there is no emitter current. It varies over a wide range for different transistors and with ambient temperature for the same transistor. Accordingly, the duration of the output pulse produced by a transistor regenerative pulse generator is a highly variable quantity.

Applicant's co-pending application for a Transistor Pulse Generator, filed December 31, 1957 under Serial No. 706,332 (now issued as Patent No. 2,989,651, dated July 20, 1961) and assigned to applicant's assignee, discloses a transistor monostable pulse generator wherein the output pulse duration is stabilized against variation in transistor current gain ($\alpha$) by employing a saturable inductive element. In some cases, however, supply or economic requirements may preclude use of nonlinear reactive elements.

An object of this invention is to provide a transistor pulse generator which employs linear reactive elements to produce output pulses of stabilized duration.

A further object is to provide a transistor regenerative pulse generator which utilizes linear reactive elements to stabilize the output pulse duration against variations in both the saturation current and the current gain of the transistor.

In one embodiment the invention is applicable to a grounded emitter type of transistor regenerative pulse generator which exhibits a negative resistance characteristic at its base terminal. The collector is connected by a capacitor to the primary winding of a transformer which has its secondary winding in series with a diode connected to the base of the transistor. A current feedback path is thus established between the collector and base. The diode is biased to be normally conducting, thereby holding the transistor in the "off" state. A trigger pulse applied to the diode momentarily renders it nonconducting, causing the transistor to turn fully "on." This results in an output voltage pulse at the collector which appears across the capacitor and primary transformer winding serially connected thereto. The resultant induced voltage across the secondary winding maintains the diode nonconductive after termination of the trigger pulse, thereby preventing the transistor from turning "off" until the capacitor charges sufficiently to reduce the secondary winding voltage below the level at which the diode is again permitted to conduct. By that time a large capacitive discharge current will be flowing in the transformer primary winding, so that a large feedback current is induced into the secondary winding which flows to the base of the transistor to turn the transistor "off." By causing this feedback current to exceed the current which the transistor supplies to an output load connected to its collector, the turn-"off" delay due to storage of minority carriers in the transistor is materially reduced. Since the time during which the transistor remains "on" is determined solely by the external circuitry associated therewith rather than by its internal characteristics, a very stable output pulse duration is achieved.

A more detailed description of the invention is presented in the following specification and accompanying drawings, in which.

Figure 1:
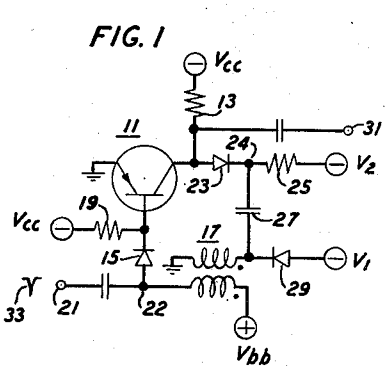
FIG. 1 is a circuit diagram of a transistor pulse generator constructed in accordance with the invention.

The circuit of FIG. 1 comprises a p-n-p point contact transistor 11 which has its emitter grounded and its collector connected by a resistor 13 to a source of negative supply voltage $V_{cc}$. The base of transistor 11 is connected by a diode 15 and the secondary winding of a transformer 17 in series to a source of positive supply voltage $V_{bb}$, diode 15 being poled to conduct toward the base. Collector supply voltage $V_{cc}$ is further applied to the base of transistor 11 through a resistor 19 which has a resistance of about the same magnitude as that of the base when transistor 11 is in the "off" state. As a result of this arrangement diode 15 is biased to be normally conducting, thus holding the base at a positive potential near $+V_{bb}$. Very little current then flows through transistor 11 and it remains in the "off" state. A small base saturation current $I_{bo}$ and collector saturation current $I_{co}$ will exist, their magnitudes being dependent both on the temperature and on the particular transistor employed. Since current $I_{co}$ flows through collector resistor 13, the collector voltage ($V_c$) will be slightly less negative than $-V_{cc}$. A trigger pulse input terminal 21 is capacitively connected to the junction point 22 of diode 15 and the secondary winding of transformer 17.

The collector of transistor 11 is connected by a diode 23 and a resistor 25 in series to a source of negative direct voltage $V_2$ which is more positive than the voltage $-V_{cc}$ by the amount of the voltage drop which would be produced across collector resistor 13 by the maximum anticipated value of collector saturation current $I_{co}$. Diode 23 is poled to conduct in a direction away from the collector, so that the voltage at junction point 24 of that diode and resistor 25 will remain clamped at $-V_2$ until the collector voltage rises above that level. Between junction point 24 and ground there is connected a capacitor 27 and the primary winding of a transformer 17 in series, the junction of the latter two elements being connected by a diode 29 to a source of negative direct voltage $V_1$ approximately equal to the difference between the magnitude of the pulse produced at the collector of transistor 11 when it changes state and base supply voltage $V_{bb}$. Output pulses are produced at the collector of transistor 11, and may be supplied to a load (not shown) connected between ground and an output terminal 31 capacitively connected to the collector.

Figures 2, 3, 4, 5:
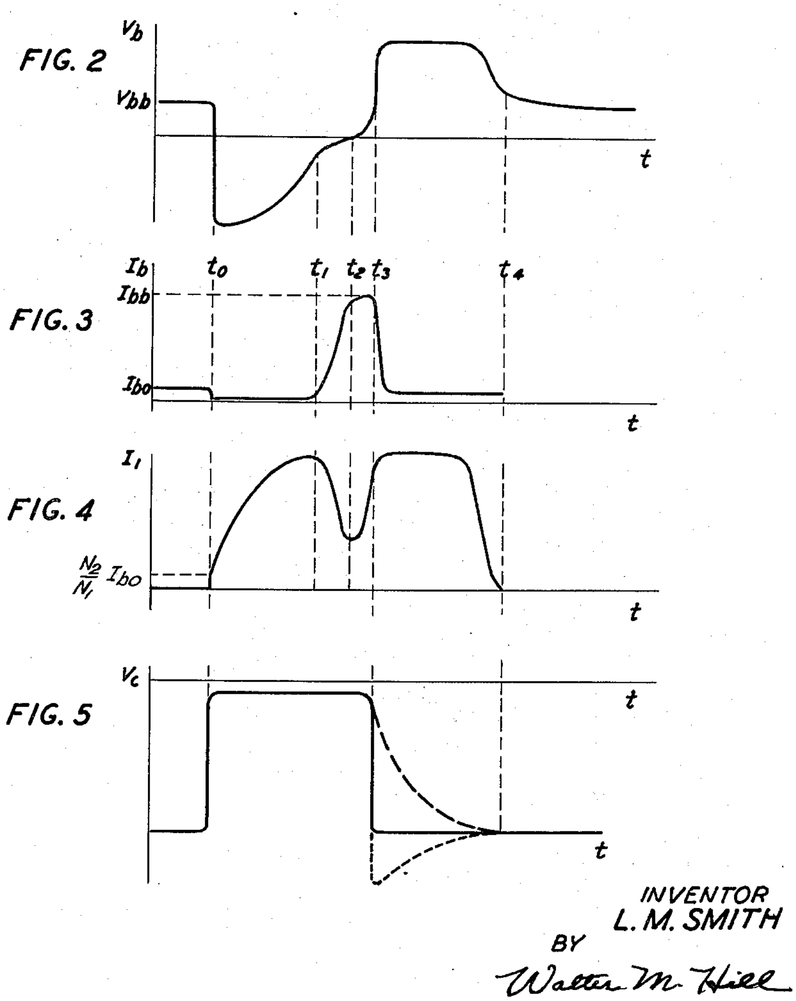
FIGS. 2 to 5 are waveforms of various voltages and currents involved in the operation of the circuit of FIG. 1.

Assume that at time $t_0$ a negative trigger pulse 33 is applied to input terminal 21 and that its amplitude exceeds base supply voltage $V_{bb}$. The voltage at the base of transistor 11 will thereby drop approximately from $+V_{bb}$ to zero (ground), causing current to flow from the emitter and from the base to the collector. Since the base-to-emitter impedance then becomes very small, the voltage at the base is prevented from dropping below zero and diode 15 becomes biased in the nonconducting direction. Of course, that prevents further current flow through that element to the base. However, by virtue of application of collector supply voltage $V_{cc}$ to the base through resistor 19, a sufficient emitter current flow is established to assure that transistor 11 turns fully "on." The resistance between the emitter and collector then becomes very small, producing a sudden rise in collector voltage $V_c$ nearly to zero as shown in the waveform of FIG. 5. This positive pulse will appear at output terminal 31, and will also be coupled by diode 23 and capacitor 27 to the primary winding of transformer 17. It should be noted that although input trigger pulse 33 appears across the secondary winding of transformer 17, and so is induced across the primary winding, it is prevented from reaching output terminal 31 because its polarity is opposed to the direction in which diode 23 is conductive while transistor 11 is "off." The diode therefore serves to isolate trigger pulses from output terminal 31, as well as to prevent the output pulse produced at the collector of transistor 11 from reaching capacitor 27 until it has risen to a level more positive than that of clamping voltage $V_2$ as described above.

If the turns ratio of transformer 17 is unity, the positive voltage pulse produced across the primary winding when transistor 11 turns "on" will induce an equal voltage pulse across the secondary winding. As shown by the dots adjacent the terminals thereof, in accordance with conventional practice, the relative directions of the turns of the windings of transformer 17 are such that this induced voltage will render the voltage at junction point 22 negative. Diode 15 is thus maintained nonconducting, preventing base supply voltage $V_{bb}$ from supplying current to the base of transistor 11 and so preventing the transistor from turning "off." The waveform of the voltage at junction point 22 is shown in FIG. 2, where it is denoted $V_b$. The value to which it drops at time $t_0$ is approximately equal to the difference between the amplitude of the pulse produced at the collector of transistor 11 at that time and base supply voltage $V_{bb}$.

The foregoing events occur almost instantaneously, causing capacitor 27 to begin discharging in the loop comprising the primary winding of transformer 17, ground, the emiter-to-collector path of transistor 11, and diode 23. This discharge current $I_1$ in the transformer primary winding will increase with time sinusoidally in accordance with the relation $$I_1 = E_c\sqrt{C/L}\,\sin\frac{t}{\sqrt{LC}} + I_{bo} \tag{1}$$

where L is the mutual inductance of transformer 17, C is the capacitance of capacitor 27, $t$ is time, and $E_c$ is the amplitude of the voltage pulse which would be produced at the collector of transistor 11 if its saturation current when in the "on" state had the maximum anticipated value. The base saturation current $I_{bo}$ appears in the foregoing relation because it is induced from the secondary winding of transistor 11 into the primary winding when diode 15 becomes nonconductive. The waveform of current $I_1$ is shown in FIG. 4. As indicated, the base saturation current $I_{bo}$ is so small relative to the amplitude which $I_1$ attains that its effect on the entire waveform is negligible. The waveform of the base current $I_b$ of transistor 11 is shown in FIG. 3.

As capacitor 27 discharges, the voltage across the primary winding of transformer 17 and so also the induced voltage across the secondary winding continually drop. Voltage $V_b$ at junction point 22 therefore increases, following a negative cosine waveform in accordance with the relation $$V_b = V_{bb} - E_c \cos\frac{t}{\sqrt{LC}} \tag{2}$$

When $V_b$ almost reaches zero, which will be at some later time $t_1$ as shown in the waveforms of FIGS. 2 to 5, diode 15 will again become conductive. A portion $I_{fb}$ of the current $I_1$ flowing in the primary winding of transformer 17, which by then will be very large, therefore transfers to the secondary winding. This feedback current $I_{fb}$ flows through diode 15 into the base of transistor 11, producing a sharp rise in base current $I_b$ which causes interruption of the current flow between the emitter and the collector. The increase in base current $I_b$ and equal reduction of current $I_1$ occurs as shown in FIGS. 3 and 4 respectively. As indicated, neither of these current changes occur instantaneously at time $t_1$, but rather take place over a small interval extending to a later time $t_2$. This is due both to the nonideal performance of diode 15 and to the finite (nonzero) base resistance of transistor 11 in the "on" state. Even at time $t_2$, when base current $I_b$ will have interrupted the flow of emitter current, the phenomenon known in the transistor art as storage of "minority carriers," which for a p-n-p transistor are "holes," causes current to continue to flow between the base and collector until a still later time $t_3$. As a result, transistor 11 does not return to the stable "off" state until time $t_3$ and the output voltage at its collector does not drop back to the quiescent level near $-V_{cc}$ until that instant.

The amount of feedback current $I_{fb}$ which is caused to flow into the base of transistor 11 when the latter is turned "off" is related to the current which flows to the load which may be connected to output terminal 31. That is, since the current fed to the base interrupts the emitter current, the base current must be equal to the total collector current which flows at that instant. Some of the collector current flows through the load, some flows through resistor 13, and the remainder flows through capacitor 27 and the primary winding of transformer 17. The load current is equal to the amplitude of the output voltage pulse produced at the collector of transistor 11 divided by the load resistance. If the magnitude of the current $I_1$ which is flowing in the primary winding of transformer 17 at the instant diode 15 becomes conductive is just equal to the load current, $I_1$ will be reduced to zero and the feedback current $I_{fb}$ induced in the transformer secondary winding will be equal to the load current. On the other hand, if the value of $I_1$ just before diode 15 becomes conductive exceeds the load current, some current will continue to flow in the primary winding of transformer 17 even after that instant. The feedback current $I_{fb}$ induced in the secondary winding will then have a value equal to the sum of the collector load current and the current which continues to flow in the primary winding. In this way the current which flows into the base of transistor 11 when it is turned "off" may be increased to a value exceeding the load current. This has the important advantage of increasing the speed with which holes stored in transistor 11 are swept out when the latter is turned "off," thus reducing the delay interval from time $t_2$ to time $t_3$ and rendering the output pulse duration less dependent on the hole storage characteristics of transistor 11. Since relation (1) above shows that the magnitude of current $I_1$ is proportional to the $$\sqrt{\frac{C}{L}}$$

capacitor 27 and transformer 17 can be chosen to establish a value of $I_1$ which minimizes the turn-"off" delay due to hole storage. Of course, since current $I_1$ flows between the emitter and collector of transistor 11, if it is made too large it will result in so many holes being produced as to overcome the advantage of the higher speed with which they are swept out when the transistor is turned "off."

The turns ratio of transformer 17 also affects the delay interval between times $t_1$ and $t_3$. If the secondary winding has more turns than the primary winding, as in a step-up transformer, the magnitude of the feedback current $I_{fb}$ which is produced in the secondary winding when diode 15 becomes conductive will be reduced. As pointed out above, this will increase the effects of hole storage in transistor 11. Consequently, unless the load which is connected to terminal 31 is so small that hole storage is a negligible consideration, it is preferable to use a step-down transformer. On the other hand, if the load is actually very small, a step-up transformer will have the advantage of reducing the effective resistance which is coupled to the primary winding of transformer 17 due to the resistance of the base of transformer 11 and of diode 15. That is, the interval required for capacitor 27 to charge sufficiently to initiate turn-"off" of transistor 11 will be less dependent on variations in the values of those resistances. A counterbalancing factor, however, is that increasing the step-up turns ratio of transformer 17 increases the leakage inductance which is coupled to the secondary winding. That will reduce the rate of increase of the feedback current $I_{fb}$ in that winding after diode 15 becomes conductive, so that too large a step-up turns ratio may increase the delay between times $t_1$ and $t_2$. The proper turns ratio is therefore a function of the particular requirements placed on the pulse generator, and can best be determined from laboratory experiment with the above considerations as guiding principles.

When transistor 11 turns "off" at time $t_3$, as described, the base current $I_b$ sharply drops to its initial value $I_{bo}$ as shown in FIG. 3. The sudden reduction in that current, which had been flowing in the secondary winding of transformer 17, induces an equal increase in the current $I_1$ flowing in the primary winding. The latter current therefore returns to substantially the same value as it had just before transistor 11 began to turn "off," as shown in FIG. 4. However, since the cessation of current flow through transistor 11 tends to interrupt the current $I_1$ which is flowing in the primary winding of transformer 17, a voltage pulse is induced in that winding which is negative at its dotted terminal. If this negative voltage pulse across transformer 17 should exceed the negative voltage pulse at the collector of transistor 11, it would be conveyed through capacitor 27 and diode 23 and would result in a negative overshoot at the trailing edge of the output pulse at terminal 31. The voltage at that terminal would then only gradually rise to the quiescent collector voltage level near $-V_{cc}$. On the other hand, if the voltage change induced across transformer 17 should be less than the voltage change which tends to occur at the collector of transistor 11, the latter voltage would be unable to drop to its quiescent value until capacitor 27 charged to the difference between that value and the voltage change across the transformer. Both of these possibilities are prevented by diode 29 and voltage source $V_1$, which clamp the voltage across transformer 17 to a maximum negative level approximately equal to the difference between base supply voltage $V_{bb}$ and the amplitude of the output pulse produced at the collector of transistor 11. The voltage existing across transformer 17 at the instant transformer 11 turns "off" is approximately equal to $V_{bb}$, since that is when diode 15 is rendered conductive. Consequently, this voltage clamping arrangement results in a voltage change across the transformer windings just equal to the change in voltage at the collector of transistor 11 when turn-"off" occurs. A sharp drop of the output pulse $V_c$ to its final quiescent level is thereby achieved as shown by the solidly drawn trailing edge of the waveform thereof in FIG. 5. The trailing edge shown dashed (above) illustrates what would occur if clamping voltage $V_1$ was insufficiently negative, while the trailing edge shown dotted (below) corresponds to clamping voltage $V_1$ being too negative. Of course, the sudden drop in voltage across the primary winding of transformer 17 produces an equal voltage drop across the secondary winding which will be negative at its dotted terminal. As shown in FIG. 2, the voltage $V_b$ at junction point 22 therefore rises sharply at time $t_3$ by an amount substantially equal to the amplitude of the voltage pulse at the collector of transistor 11.

The foregoing events complete the operation of turning transistor 11 "off," but the current $I_1$ which had been flowing in the primary winding of transformer 17 will then continue to flow in the path including that winding, diode 29 and the source of clamping voltage $V_1$. In addition, the voltage across that winding will be maintained at $V_1$, so that the magnetic flux linking both transformer windings is forced to change at a uniform rate proportional to voltage $V_1$. This maintains the voltage across the secondary winding also equal to $V_1$, so that the voltage $V_b$ at junction point 22 remains constant. However, as the flux linking both windings approaches the level corresponding to the current $I_1$ flowing in the primary winding, its rate of change decreases. The magnitude of the voltage across each transformer winding, therefore drops causing the voltage at the junction of the primary winding and diode 29 to rise. This renders diode 29 nonconductive, so that capacitor 27 begins to charge from the source of voltage $V_2$ through resistor 25 and through the primary winding of transformer 17. The capacitor voltage rapidly becomes equal to voltage $V_2$, and the voltage across transformer 17 drops to zero. This complete sequence is illustrated by the waveforms of voltage $V_b$ and current $I_1$ in FIGS. 2 and 4, the circuit returning to its quiescent state at time $t_4$.

Figure 6:
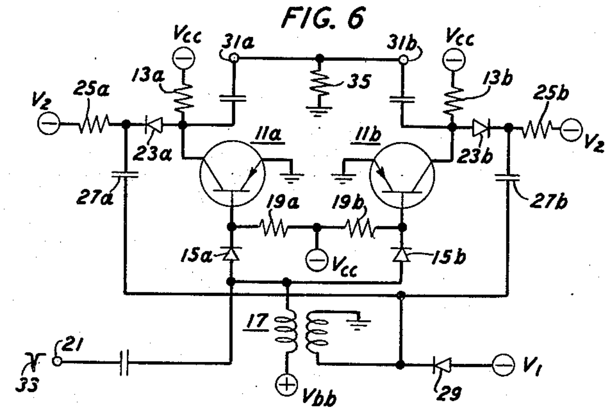
FIG. 6 is a circuit diagram of a transistor pulse generator employing two circuits as in FIG. 1 parallel to achieve increased load current capacity.

In many applications it is desirable to increase the load current capacity of the pulse generator of FIG. 1 by using two such generators connected in parallel. A circuit of this type is shown in FIG. 6, and essentially comprises two of the circuits of FIG. 1 sharing a single transformer 17 and diode 29 and a single input terminal 21. The latter terminal is capacitively connected in parallel to the terminals of a pair of diodes **15*a* and 15*b* which, in each half of the circuit of FIG. 6, correspond to diode 15** of FIG. 1. All components of the circuit of FIG. 6 which directly correspond to a similar component of the circuit of FIG. 1 have been identified with the same reference numeral, but with the suffix "*a*" for a component in the left half of FIG. 6 and a suffix "*b*" for a component in the right half thereof. The circuit output terminals **31*a* and 31*b* may be capacitively connected in parallel to one terminal of a load 35** which is grounded at its opposite terminal.

When a negative trigger pulse 33 is applied to input terminal 21 of FIG. 6, both of transistors **11*a* and 11*b* will turn "on," This is assured by using two separate diodes 15*a* and 15*b* connected to the bases of both transistors rather than attempting to use a single diode connected in parallel to both bases. In the latter case, there would be a good possibility that since the base voltage of the first transistor to turn "on" will be held substantially at zero it might prevent the voltage at the base of opposite transistor from dropping sufficiently negative to cause it to turn "on." Once both transistors are "on," both will contribute in parallel to the current flow through load 35**. However, the transistor having the smallest collector voltage will supply more load current than the opposite transistor. Since that transistor is also the one having the smallest emitter-to-collector impedance in the "on" state, it is able to supply this extra load current without excessive internal heating. This is manifestly a desirable operating condition, since it will result in automatic optimizing of the load current distribution between both transistors in spite of changes in their characteristics with age.

The operation of each half of the circuit of FIG. 6 will be the same as the circuit of FIG. 1, both of transistors 11*a* and 11*b* turning "on" and "off" at substantially the same instants. With regard to the turning "off" operation, if one transistor should tend to change to that state before the other, the consequent drop in its base current would result in an increase in the base current supplied to the other through the secondary winding of transformer 17. The other transistor would thereby be forced to also turn "off" at about the same time.

While the invention has been described in terms of specific circuit embodiments incorporating it, it will be obvious to those skilled in the pulse generation art that many variations and modifications thereof may be made without departing from the scope and teachings of the invention. For example, a type *p* point contact transistor could easily be substituted for the type *n* point contact transistor used in each of the described circuits by simply reversing the polarity of all supply voltages and diodes. In general, since each transistor and each described circuit essentially serves as a switch capable of being controlled to assume either an "on" or an "off" state, any type of transistor or other switching element capable of performing in that manner is adapted to be used in practicing the invention.

What is claimed is:

1. A pulse generator comprising a transistor having an emitter, a collector and a base, a capacitor connected at one of its terminals to said collector, a diode connected at one of its terminals to said base, a transformer having a primary winding connected between the other terminal of said capacitor and said emitter, said transformer further having a secondary winding connected between the other terminal of said diode and said emitter, means for applying a base supply voltage to said diode which is conducted thereby to said base to render said transistor nonconducting, whereby the voltage at its collector assumes a quiescent level to which said capacitor charges, means for applying a trigger pulse to said transistor to render it conducting, whereby the voltage at its collector changes to an active level and causes said capacitor to produce an increasing discharge current through and a decreasing voltage across said primary winding, said transformer being so constructed that the voltage across said primary winding induces a voltage across said secondary winding which maintains said diode nonconducting until the voltage across said primary winding reaches a predetermined level, at which time the discharge current flowing in said primary winding induces a feedback current in said secondary winding which flows through said diode to said base to again render said transistor nonconducting.

2. The pulse generator of claim 1, further including voltage clamping means connected to said primary winding for preventing the voltage across that winding from changing by more than an amount substantially equal to the voltage change which is produced at said collector when said transistor again becomes nonconducting.

3. A pulse generator comprising a transistor having an emitter, a collector and a base, resistive means for applying a collector supply voltage between said emitter and collector, a capacitor connected at one of its terminals to said collector, a diode connected at one of its terminals to said base, a transformer having a primary winding connected between the other terminal of said capacitor and said emitter, said transformer further having a secondary winding connected between the other terminal of said diode and said emitter, means for applying a base supply voltage to said diode which is conducted thereby to said base to render said transistor nonconducting, whereby the voltage at its collector assumes a quiescent level, means for applying a trigger pulse to said transistor to render it conducting and thereby produce a voltage pulse at its collector, voltage clamping means connected to said collector for causing said capacitor to charge while said transistor is nonconducting to an initial voltage a fixed amount less than said collector supply voltage, said voltage clamping means being further adapted to permit the portion of the voltage pulse produced at said collector which exceeds said initial voltage to reach said capacitor and cause it to produce an increasing discharge current through and a decreasing voltage across said primary winding, said transformer being so constructed that the decreasing voltage across said primary winding induces a decreasing voltage across said secondary winding which initially overcomes said base supply voltage to maintain said diode nonconducting and then drops below said base supply voltage to cause said diode to again become conducting, at which time the discharge current flowing in said primary winding induces a feedback current in said secondary winding which flows through said diode to said base to again render said transistor nonconducting.

4. The pulse generator of claim 3, further including additional voltage clamping means connected to said primary winding for preventing the voltage across that winding from changing by more than an amount substantially equal to the voltage change which is produced at said collector when said transistor again becomes nonconducting.

5. A pulse generator comprising a transistor having an emitter, a collector and a base, a diode connected at one terminal to said base, bias means for forward biasing said diode and causing said transistor to normally assume an "off" state wherein the voltage at its collector is at a quiescent level, reactive means connected between said emitter and collector, means for applying a trigger pulse to said transistor to cause it to assume an "on" state wherein the voltage at its collector changes to an active level which produces a decreasing voltage across and an increasing current through said reactive means, feedback means connected between the other terminal of said diode and said emitter and inductively coupled to said reactive means so that said diode is backward biased during said increasing current through said reactive means and forward biased when the voltage across said reactive means reaches a predetermined level to cause a feedback current to flow through said diode to said base to return said transistor to said "off" state.

6. A pulse generator comprising a transistor having an emitter, a collector and a base, a diode connected at one terminal to said base, biasing means for forward biasing said diode and causing said transistor to normally assume an "off" state wherein the voltage at its collector is at a quiescent level, reactive means connected between said emitter and collector, voltage clamping means connected to said reactive means for isolating the voltage at said collector therefrom until that voltage exceeds a predetermined clamping level, means for applying a trigger pulse to said transistor to cause it to assume an "on" state wherein the voltage at its collector changes to an active level exceeding said clamping level and produces a decreasing voltage across and an increasing current through said reactive means, and feedback means connected between the opposite terminal of said diode and said emitter and inductively coupled to said reactive means so that said diode is backward biased during said increasing current through said reactive means and forward biased when the voltage across said reactive means reaches a predetermined level to cause a feedback current to flow through said diode to said base to return said transistor to said "off" state.

7. A pulse generator comprising a transistor having an emitter, a collector and a base, a diode connected at one terminal to said base, bias means for forward biasing said diode and causing said transistor to normally assume an "off" state wherein the voltage at its collector is at a quiescent level, means for connecting a load between said emitter and collector, reactive means further connected between said emitter and collector, means for applying a trigger pulse to said transistor to cause it to assume an "on" state wherein the voltage at its collector changes to an active level which produces a decreasing voltage across and an increasing current through said reactive means and a current through said load, said reactive means being so constructed that when the voltage across it drops to a predetermined level the current flowing there-through will exceed said load current, feedback means connected between said diode and said emitter and inductively coupled to said reactive means so that said diode is backward biased during said increasing current through said reactive means and forward biased when the voltage across said reactive means reaches said predetermined level, at which time said current feedback means supplies a feedback current through said diode to said base to return said transistor to said "off" state.

8. A pulse generator comprising a transistor having an emitter, a collector and a base, a diode connected at one terminal to said base, bias means for forward biasing said diode to apply a bias voltage between said emitter and base which causes said transistor to normally assume an "off" state wherein the voltage at its collector is at a quiescent level, means for connecting a load between said emitter and collector, reactive means further connected between said emitter and collector, voltage clamping means connected to said reactive means for isolating the voltage at said collector therefrom until it exceeds a predetermined clamping level, means for applying a trigger pulse to said transistor to cause it to assume an "on" state wherein the voltage at its collector changes to an active level exceeding said clamping level and produces a decreasing voltage across and an increasing current through said reactive means and a current through said load, said reactive means being so constructed that when the voltage across it drops to a predetermined level the current there-through will exceed said load current, feedback means connected between said diode and said emitter and inductively coupled to said reactive means, said feedback means being adapted to apply a voltage to said diode which maintains it nonconducting during said increasing current through said reactive means until the voltage across said reactive means reaches said predetermined level, at which time said feedback means supplies a feedback current through said diode to said base to return said transistor to said "off" state.

9. A pulse generator comprising a transistor having an emitter, a collector and a base, a capacitor connected at one of its terminals to said collector, a diode connected at one of its terminals to said base, a transformer having a primary winding connected between the other terminal of said capacitor and said emitter, said transformer further having a secondary winding connected between the other terminal of said diode and said emitter, means for further connecting an output load between said emitter and collector, means for applying a base supply voltage to said diode which is conducted thereby to said base to render said transistor nonconducting, whereby the voltage at its collector assumes a quiescent level to which said capacitor charges, means for applying a trigger pulse to said transistor to render it conducting, whereby the voltage at its collector changes to an active level which produces a current through said load and causes said capacitor to produce an increasing discharge current through and a decreasing voltage across said primary winding, said capacitor and said primary winding being so proportioned that when the voltage across said primary winding reaches a predetermined level the discharge current through that winding will exceed said load current, said transformer being so constructed that the voltage across said primary winding induces a voltage across said secondary winding which maintains said diode nonconducting until the voltage across said primary winding reaches a predetermined level, at which time the discharge current flowing in said primary winding induces a feedback current in said secondary winding which flows through said diode to said base to again render said transistor nonconducting.

10. A pulse generator comprising a transistor having an emitter, a collector and a base, resistive means for applying a collector supply voltage between said emitter and collector, a capacitor connected at one of its terminals to said collector, a diode connected at one of its terminals to said base, a transformer having a primary winding connected between the other terminal of said capacitor and said emitter, said transformer further having a secondary winding connected between the other terminal of said diode and said emitter, means for further connecting an output load between said emitter and collector, means for applying a base supply voltage to said diode which is conducted thereby to said base to render said transistor nonconducting, whereby the voltage at its collector assumes a quiescent voltage level, means for applying a trigger pulse to said transistor to render it conducting and thereby produce a voltage pulse at its collector which establishes a current through said load, voltage clamping means connected to said collector for causing said capacitor to charge while said transistor is nonconducting to an initial voltage a fixed amount less than said collector supply voltage, said voltage clamping means being further adapted to permit the portion of the voltage pulse produced at said collector which exceeds said initial voltage to reach said capacitor and cause it to produce an increasing discharge current through and a decreasing voltage across said primary winding, said transformer being so constructed that the decreasing voltage across said primary winding induces a decreasing voltage across said secondary winding which initially overcomes said base supply voltage to maintain said diode nonconducting and then drops below said base supply voltage to cause said diode to again become conducting, said capacitor and said primary winding being so proportioned that the discharge current in said primary winding at that time exceeds said load current, whereby the discharge current in said primary winding at the time said diode becomes conducting induces a feedback current in said secondary winding which flows through said diode to said base to again render said transistor nonconducting.

11. The pulse generator of claim 10, further including additional voltage clamping means connected to said primary winding for preventing the voltage across that winding from changing by more than an amount substantially equal to the voltage change which is produced at said collector when said transistor again becomes nonconducting.

12. A pulse generator comprising a plurality of transistors which each have an emitter, a collector and a base, a plurality of capacitors of which one terminal of each is connected to the collectors of respective ones of said transistors, a plurality of diodes of which one terminal of each is respectively connected to the bases of respective ones of said transistors, a transformer having a primary winding connected between the remaining terminals of all said capacitors and the emitters of all said transistors, said transformer further having a secondary winding connected between the remaining terminals of all said diodes and the emitters of all said transistors, means for connecting an output load between the collector and emitter of each of said transistors, means for applying a base supply voltage to each of said transistors to render all transistors nonconducting, whereby the voltage of each of said collectors assumes a quiescent voltage level to which the capacitor connected thereto charges, means for transmitting a trigger pulse to each of said transistors to render them conducting, whereby the voltage of each of said collectors changes to an active level which causes the capacitor connected thereto to produce an increasing discharge current through and a decreasing voltage across said primary winding, said transformer being so constructed that the voltage across said primary winding induces a voltage across said secondary winding which maintains each of said diodes nonconducting until the voltage across said primary winding reaches a predetermined level, at which time the discharge current flowing in said primary winding induces a feedback current in said secondary winding which flows through each of said diodes to the base of each of said transistors to again render each of said transistors nonconducting.

13. A pulse duration stabilized monostable multivibrator comprising a transistor having an emitter, a collector and a base electrode, said transistor being adapted to change from the "off" to the "on" state in response to a trigger pulse applied to one of said electrodes, a transformer having a primary winding and a secondary winding, a diode for connecting said secondary winding to said base electrode, and a capacitor for connecting said primary winding to said collector electrode, whereby when said transistor changes from the "off" to the "on" state a surge voltage is produced in said primary winding which reverses after a definite interval, said primary and secondary windings being so arranged that the surge voltage renders said diode nonconducting until that voltage reverses, at which time a current is induced by said primary winding into said secondary winding to cause said transistor to change from the "on" to the "off" state.

References Cited in the file of this patent

UNITED STATES PATENTS

| | | |
|---|---|---|
| 2,810,080 | Trousdale | Oct. 15, 1957 |
| 2,846,580 | Light | Aug. 5, 1958 |
| 2,848,613 | Green et al. | Aug. 19, 1958 |
| 2,889,510 | Carmichael | June 2, 1959 |
| 2,936,383 | Mees | May 10, 1960 |
| 2,939,968 | Durbin | June 7, 1960 |
| 2,945,190 | Mattson | July 12, 1960 |